(12) United States Patent
Ahsan et al.

(10) Patent No.: US 8,745,451 B2
(45) Date of Patent: Jun. 3, 2014

(54) METHOD AND DEVICE FOR PROCESSING SIGNAL DATA

(75) Inventors: Rajib Ahsan, Constance (DE); Christian Unruh, Stuttgart (DE); Marco Hering, München (DE)

(73) Assignee: Sony Corporation, Tokyo (JP)

( * ) Notice: Subject to any disclaimer, the term of this patent is extended or adjusted under 35 U.S.C. 154(b) by 854 days.

(21) Appl. No.: 12/821,692

(22) Filed: Jun. 23, 2010

(65) Prior Publication Data

US 2011/0060976 A1 Mar. 10, 2011

(30) Foreign Application Priority Data

Jul. 2, 2009 (EP) .................................... 09008681

(51) Int. Cl.
G06F 11/00 (2006.01)
G06F 7/02 (2006.01)

(52) U.S. Cl.
USPC ......................................... 714/708; 714/819

(58) Field of Classification Search
USPC ......................................... 714/704, 708, 819
See application file for complete search history.

(56) References Cited

U.S. PATENT DOCUMENTS

| | | | |
|---|---|---|---|
| 7,516,395 B2* | 4/2009 | Nurmi et al. ................... | 714/819 |
| 8,212,826 B1* | 7/2012 | Williams et al. ............... | 345/520 |
| 2003/0177438 A1* | 9/2003 | Waschura et al. ............. | 714/819 |
| 2007/0083790 A1* | 4/2007 | Nurmi et al. .................... | 714/12 |
| 2008/0133982 A1* | 6/2008 | Rawlins et al. ............... | 714/699 |
| 2009/0083583 A1* | 3/2009 | Seem et al. ..................... | 714/39 |
| 2009/0268848 A1* | 10/2009 | Tan et al. ....................... | 375/316 |
| 2010/0100799 A1* | 4/2010 | Kurachi et al. ............... | 714/819 |
| 2010/0251075 A1* | 9/2010 | Takahashi et al. ............ | 714/773 |

FOREIGN PATENT DOCUMENTS

| | | |
|---|---|---|
| EP | 1 821 417 A1 | 8/2007 |
| EP | 1 840 823 A1 | 10/2007 |

OTHER PUBLICATIONS

Damera-Venkata, N.; Kite, T.D.; Geisler, W.S.; Evans, B.L.; Bovik, A.C.; , "Image quality assessment based on a degradation model," Image Processing, IEEE Transactions on , vol. 9, No. 4, pp. 636-650, Apr. 2000.*

Gunturk, B.K.; Glotzbach, J.; Altunbasak, Y.; Schafer, R.W.; Mersereau, R.M.; , "Demosaicking: color filter array interpolation," Signal Processing Magazine, IEEE , vol. 22, No. 1, pp. 44-54, Jan. 2005.*

Ai, C.; Guoxiang, A., "Removing the quantization error by repeated observation [image processing]," Signal Processing, IEEE Transactions on , vol. 39, No. 10, pp. 2317,2320, Oct. 1991.*

* cited by examiner

*Primary Examiner* — Cynthia Britt
(74) *Attorney, Agent, or Firm* — Oblon, Spivak, McClelland, Maier & Neustadt, L.L.P.

(57) ABSTRACT

A method of processing signal data comprises receiving signal data, calculating a first k-th moment from the signal data based on a first number of samples $N_1$, calculating a second k-th moment from the signal data based on a second number of samples $N_2$, the first number $N_1$ being different than the second number $N_2$, calculating a combined error, the combined error being a function of the first and second k-th moments, classifying a data region of the signal data as flat if the combined error is below or equal to a threshold curve in the data region, and classifying a data region of the signal data as non-flat if the combined error is higher than the threshold curve in the data region.

14 Claims, 10 Drawing Sheets

METHOD AND DEVICE FOR PROCESSING SIGNAL DATA

FIELD OF THE INVENTION

This specification relates to a method and a device for processing signal data. The specification also relates to a computer program product comprising a computer program means that is adapted to carry out the method and the steps thereof when it is carried out on a data processing device. Further, the specification relates to a computer readable storage medium comprising this computer program product.

BACKGROUND OF THE INVENTION

In photo- and video-related applications and customer devices, image data are usually pre-processed in order to better adapt the image properties before the images or pictures are displayed or further processed. One aspect is the enhancement of sharpness of the image or picture. A problem when enhancing the sharpness of an image or with respect to other pre-processing steps is that the respective process is in general applied to all image details represented by the image data. However, it is desirable to process image details that originate from noise in a different manner than image details that originate from edges in the image. Accordingly, processes have been established, in order to differentiate between homogenous and non-homogenous image regions.

Methods for classifying signals are, for example, known from EP-A-1 821 417, EP-A-1 840 823, WO 2007/096168 or U.S. Pat. No. 6,771,793.

SUMMARY OF THE INVENTION

It is an object of the invention to provide an improved method of processing signal data. The object is achieved by a method as defined in the claims. Moreover, the invention provides a device and a computer readable storage medium.

BRIEF DESCRIPTION OF THE DRAWINGS

The accompanying drawings are included to provide a further understanding of embodiments of the invention and are incorporated in and constitute a part of this specification. The drawings illustrate the embodiments of the invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

DETAILED DESCRIPTION OF THE INVENTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. Is to be understood that other embodiments may be utilized and structural or logical changes may be made without departing from the scope defined by the claims.

Figure 1:
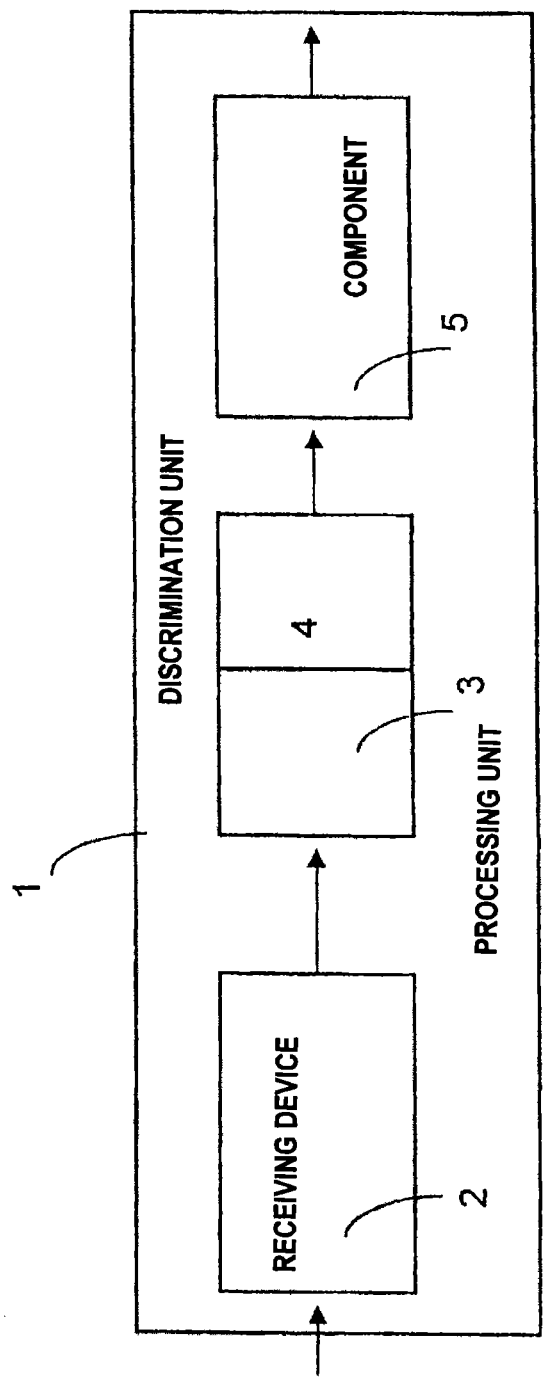
FIG. 1 shows a device for processing signal data according to an embodiment.

FIG. 1 shows a device for processing signal data according to an embodiment. The device for processing signal data 1 may comprise a receiving device 2 that may be adapted to obtain signal data. For example, the receiving device 1 may be coupled to a suitable sensor device, such as an image sensor, a video sensor, another kind of an optical sensor or an acoustic sensor or the like. The sensor may comprise a black-white detector or may be adapted to detect colours. For example, the sensor may contain elements that are adapted to detect red, elements to detect blue and elements to detect green colours. The data received by the receiving device are further transmitted to the processing unit 3. The processing unit 3 may include a discrimination unit 4 that is adapted to classify a data region of the signal data as flat or as non-flat in a manner as will be described herein below. For example, the discrimination unit 4 may assign a value of "0" to the flat data regions and a "1" to the non-flat data regions. The relationship between the sample and the value of "0" and "1" may be displayed in a decision map indicating whether a specific position corresponds to a flat or a non-flat region.

The combination of the signal data and the decision map may be further transferred to a component 5 wherein a further processing of the signal data may take place. For example, the component 5 may include a low pass filter that is adapted to filter the signal data at the flat regions and/or a high pass filter that is adapted to filter the signal data at the non-flat regions.

In the following, the action of the processing unit 3 will be explained in more detail.

Figure 2A:
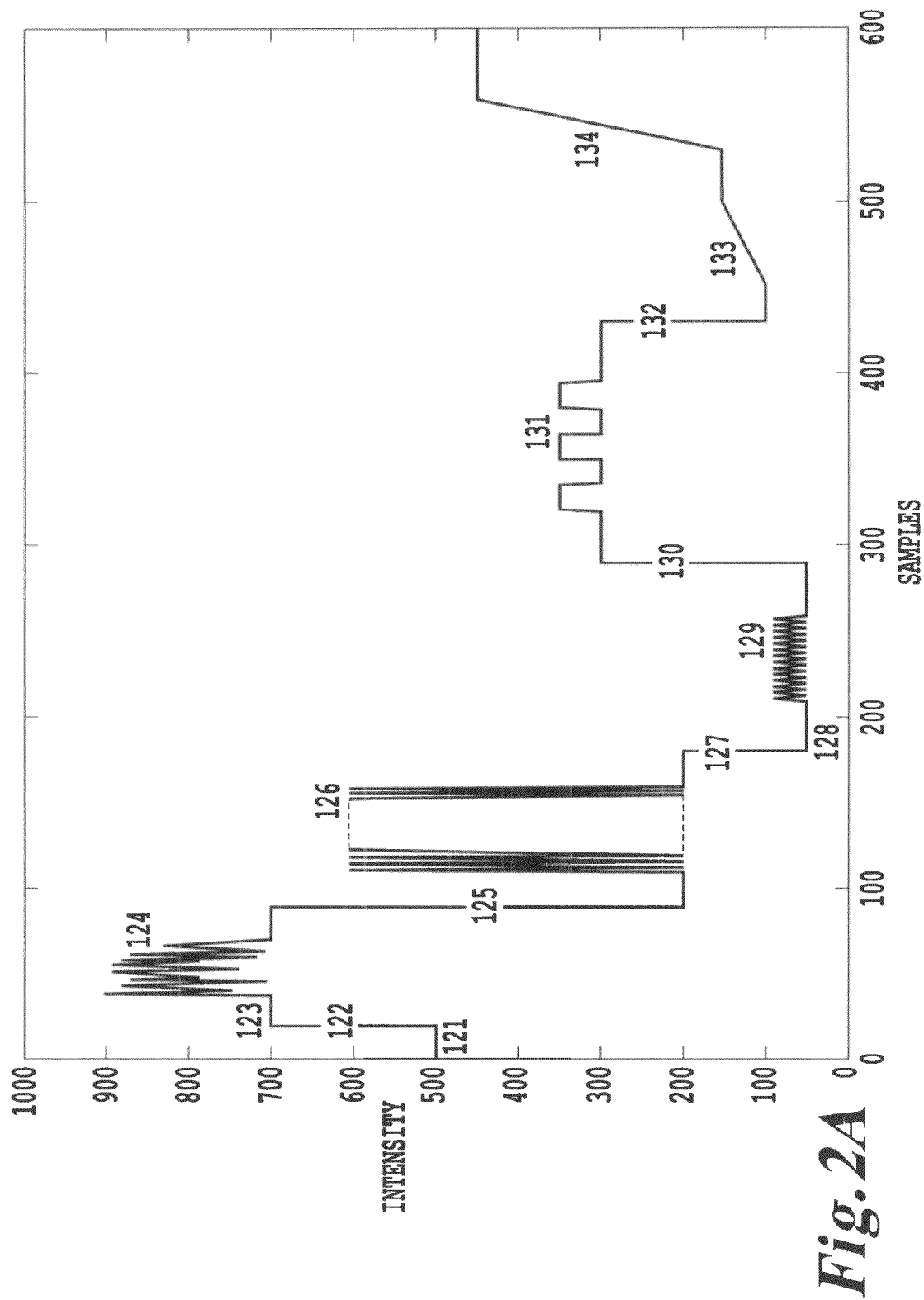
FIG. 2A shows an example of signal data that may be processed by the device shown in FIG. 1.

FIG. 2A shows an example of a test signal. This signal may be clustered into different regions that are designated with the following reference numerals:

121: Homogenous signal at medium intensity of 500
122: Edge at high intensity with lower contrast, changing from 500 to 700
123: Homogenous signal at high intensity of 700
124: Non-periodic structure
125: Edge at high intensity with sharp contrast from 700 to 200
126: Periodic structure with very large deviation and very high spatial frequency 127: Edge at low intensity region with low contrast, changing from 200 to 50
128: Homogeneous signal at very low intensity of 50
129: Periodic structure with very small deviation and very high spatial frequency
130: Edge at low intensity region with higher contrast, changing from 50 to 300
131: Periodic structure with stepped pattern containing flat areas as well as very low contrast edges with a change of 50
132: Edge at low intensity region with contrast between 1 and 2, changing from 300 to 100
133: Ramp with very small slope
134: Ramp with very high slope.

In FIG. 2A, the intensity (arbitrary units) is plotted against "samples" which may be, for example, time or position in a specific direction. Nevertheless, as is obvious to the person skilled in the art any other suitable variable may be taken as "samples".

Figure 2B:
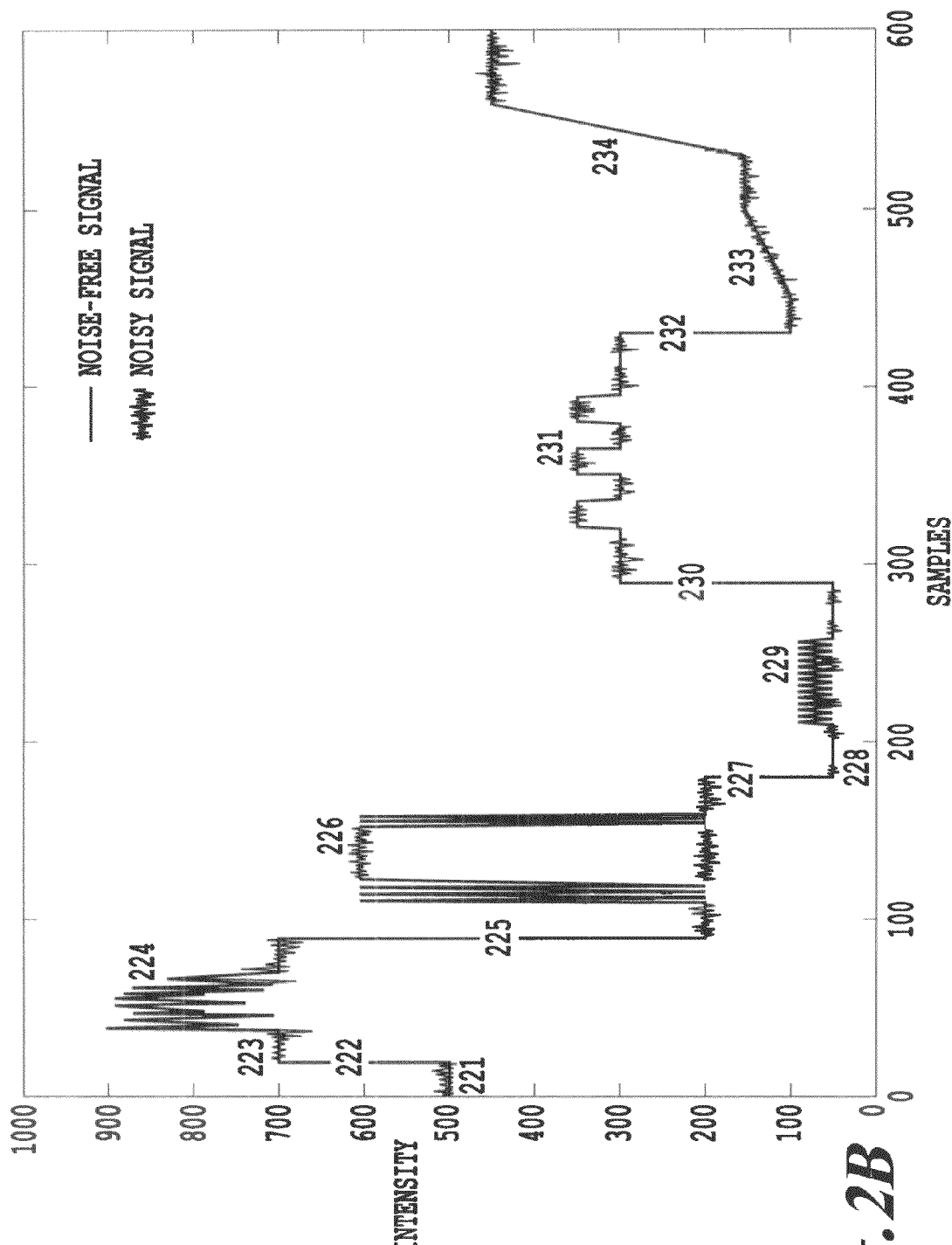
FIG. 2B shows an example of the signal shown in FIG. 2A, the signal including noise.

The signal shown in FIG. 2A may be distorted by a noise, for example a Poisson distributed noise. Usually, the kind of noise depends on the kind of sensor used. To be more specific, the kind of noise depends on the detection mechanism of the particular sensor. For example, in a digital camera system comprising a CMOS-based detection mechanism, a Poisson distributed noise may be applied. Moreover, in a transmission channel of e.g. an analog TV-system a Gaussian distributed noise may be applied. Nevertheless, as is to be clearly understood, the method and device as described herein may be applied to any kind of sensor having any kind of noise distribution. FIG. 2B shows an example of the test signal shown in FIG. 2A with applied Poisson noise. In FIG. 2B, the reference numerals of FIG. 2A are incremented by "100" and refer to the same features as shown in FIG. 2A.

Figure 2C:
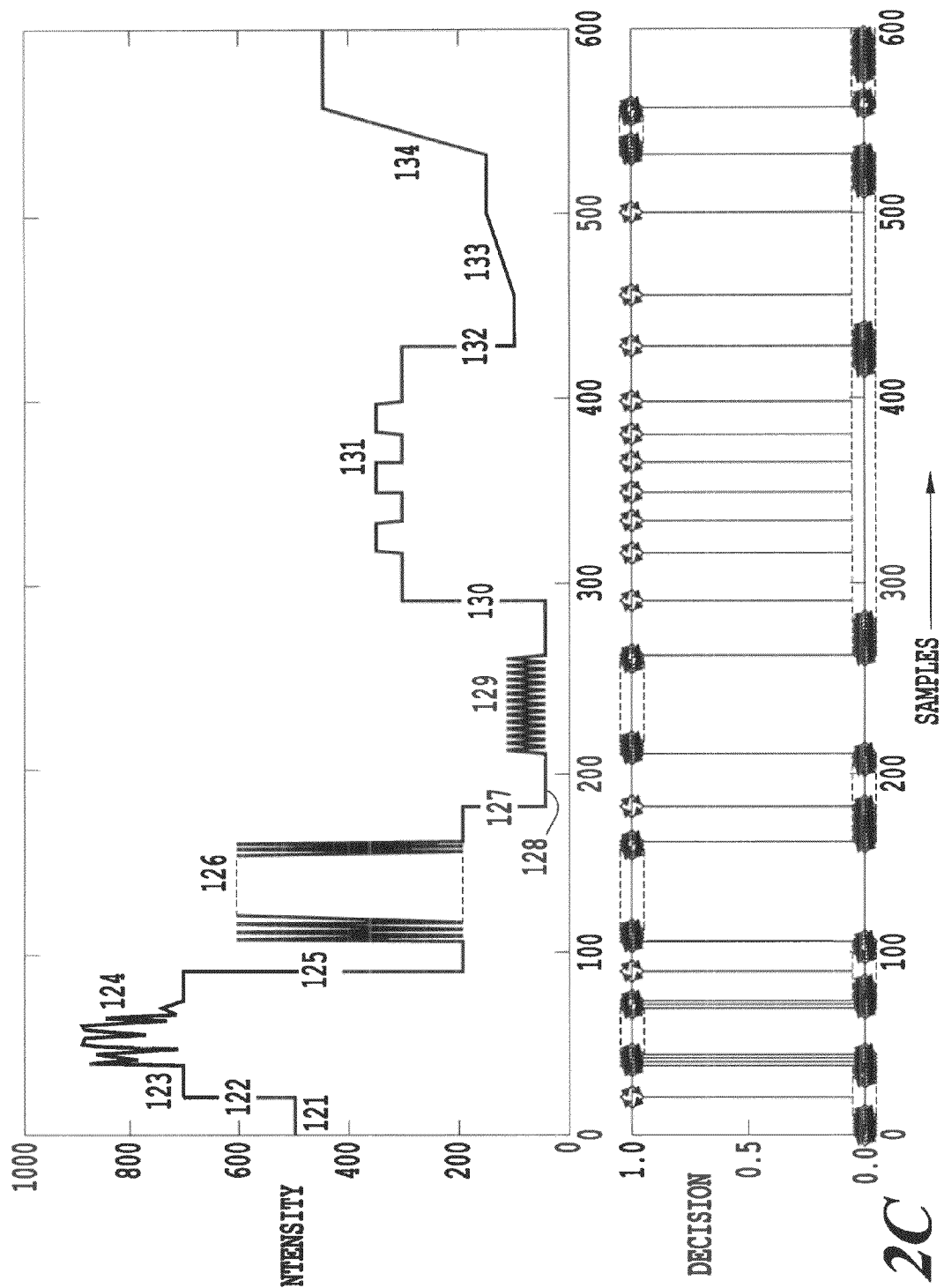
FIG. 2C shows in the upper portion thereof the diagram shown in FIG. 2A and in the lower portion thereof a decision map indicating flat and non-flat regions.

FIG. 2C shows in the upper portion thereof the signal that has already being shown in FIG. 2A. The lower portion thereof shows a decision map that may be obtained from a visual inspection of the signal data shown in the upper portion. The decision map assigns a "1" to the non-homogeneous or non-flat regions, whereas it assigns a "0" to the homogeneous or flat regions. Generally, it is desired to obtain a method by which such a decision map may be reliably generated from signal data in an automated way.

According to an embodiment, a decision map as is shown in FIG. 2C may be generated by processing the image data in the processing unit 3 shown in FIG. 1. To this end, for example, the statistical properties of the signal are exploited. To be more specific, the statistical properties of the signals are calculated on the basis of two different sets of samples. The first set of samples comprises a first number of samples $N_1$ and the second set of samples comprises a second number of samples $N_2$.

As will be explained hereinafter, a method of processing signal data may comprise receiving signal data, calculating a first k-th moment from the signal data based on a first number of samples $N_1$, calculating a second k-th moment from the signal data based on a second number of samples $N_2$, the first number $N_1$ being different than the second number $N_2$, calculating a combined error, the combined error being a function of the first and second k-th moments, classifying a data region of the signal data as flat if the combined error is below or equal to a threshold curve in the data region, and classifying a data region of the signal data as non-flat if the combined error is higher than the threshold curve in the data region.

As used within the present specification, the term "k-th moment" or "m-th moment" from signal data refers to the mathematical or stochastical moment of a random variable X. For example, the mean value of a probability distribution of X $(x_1, x_2, \ldots x_N)$ is also referred to as the first moment about zero. Moreover, the second central moment of a random variable X equals to:

$$\sigma^2 = E((X-E(X))^2)$$

In this case, the distribution of the random variable X is compared with the expectation value $E(X)$ of X. Generally speaking, the central moment in relation to the expectation value $E(X)$ may be defined as:

$$\mu_k \approx E(X-E(X))^k)$$

The normalized k-th central moment is the k-th central moment divided by $\sigma^n$. Accordingly the normalized k-th central moment may be defined as:

$$X = E((X-E(X))^n)/\sigma^n$$

These normalized central moments are dimensionless quantities, which represent the distribution independently of any linear change of scale. Accordingly, the first moment is the expectation value of a distribution. The second central moment is the standard deviation or variance of the distribution. The third central moment is called the skewness. A distribution that is skewed to the left (the tail of the distribution is heavier on the right) will have a negative skewness. A distribution that is skewed to the right (the tail of the distribution is heavier than the left) will have a positive skewness.

The fourth central moment is a measure of whether the distribution is tall and skinny or short and squat, compared to the normal distribution of the same variance. The kurtosis is defined to be the normalized fourth central moment minus three.

The method may further comprise calculating a first m-th moment from the signal data based on the first number of samples $N_1$, calculating a second m-th moment from the signal data based on the second number of samples $N_2$, m being different than k, wherein the combined error is a function of the first and second k-th moments and the first and second m-th moments.

After calculating the k-th moment and, optionally, the m-th moment from the signal data, a combined error may be calculated. For example, the combined error may simply refer to a sum or a difference of the first and second k-th moments.

Nevertheless, as is clearly to be understood, any other kind of combined error may be formed from the first and second k-th moments as well as, optionally, the first and second n-th moments of the measurement values. As a further example, the k-th moments and the m-th moments may be multiplied by a specific weighting factor. Then, the combined error may be compared with a threshold curve.

Generally, the combined error may expressed as $f(\mu_{k,1}, \mu_{k,2}, \ldots \mu_{k,n})$, wherein $\mu_k$ denotes a moment of k-th order, f denotes a suitable function, for example, an arithmetic function, and n denotes the number of different sample numbers $N_1, N_2, \ldots N_n$ that are used for detecting flat and non-flat regions.

According to an example, k may be equal to 2, so that $\mu$ corresponds to the $2^{nd}$ moment, the variance, and n may be equal to 2 so that there exist two different numbers of samples, $N_1$ and $N_2$. In this case, the combined error CE may be expressed as follows:

$$CE = f(\mu_{2,1}, \mu_{2,2})$$

Regions are classified as flat, if this combined error is equal to or below a threshold curve. Generally speaking, this threshold curve may correspond to a theoretical statistical expectation value of the combined error for a homogeneous surface.

Accordingly, $CE = f(\mu_{2,1}, \mu_{2,2}) \leq \Delta f_\mu$ $$\Delta f_\mu = \left|\frac{\partial f_\mu}{\partial \mu_{2,1}}\right|^2 \sqrt{\left(\sum_{i=1}^{N_1} \left|\frac{\partial \mu_{2,1}}{\partial x_i}\right|^2 \sigma_{xi}^2\right)} + \left|\frac{\partial f_\mu}{\partial \mu_{2,2}}\right|^2 \sqrt{\left(\sum_{j=1}^{N_2} \left|\frac{\partial \mu_{2,2}}{\partial x_j}\right|^2 \sigma_{xj}^2\right)}$$

More generally, $$f_\mu(\mu_{k,1}, \mu_{k,2} \ldots \mu_{k,n}) \leq \sum_{\ell=1}^{n}\left(\left|\frac{\partial f_\mu}{\partial \mu_{k,\ell}}\right|^2 \sqrt{\left(\sum_{i=1}^{N_\ell}\left|\frac{\partial \mu_{k,\ell}}{\partial x_i}\right|^2 \sigma_{xi}^2\right)}\right)$$

wherein the right-hand part of the term corresponds to the statistical expectation value of the combined error in dependence from the distribution. Regions in which the above relation holds are classified as flat, whereas in regions where the "≤" is replaced by a ">", are classified as non-flat.

For example, this expectation value may be determined on the basis of a normal distribution of the noise and defining a probability that defines the probability of finding a measurement value within a specific region. As an example, assuming a probability of more than 90%, for example 95.4% of finding a measurement value within this specific region, an expectation value may be determined that depends on the number of samples $N_1$, $N_2$ as well as from the noise variance.

According to the above example, wherein k=2 and n=2:

$$f_\mu(\mu_{2,1}, \mu_{2,2}) = \sigma_1 - \sigma_2 \leq \sum_{\ell=1}^{2}\left(\left|\frac{\partial \sigma_1 - \sigma_2}{\partial \sigma_\ell}\right|^2 \sqrt{\left(\sum_{i=1}^{N_\ell}\left|\frac{\partial \sigma_\ell}{\partial x_i}\right|^2 \sigma_{xi}^2\right)}\right) \leq 2\sigma_0^2\sqrt{\left(\frac{1}{N_1} - \frac{1}{N_2}\right)} \leq 2\omega\sigma_0^2\sqrt{\left(\frac{1}{N_1} - \frac{1}{N_2}\right)}$$

wherein ω denotes a tuning parameter that may be used to adjust the sensitivity. For example ω may be 1 or 2.

As a further example, in addition to the $2^{nd}$ moment (k=2), also the first moment (k=1) may be taken into account, and the combined error may depend on the first and the second moments.

$CE = f(\mu_{1,1}, \mu_{1,2}, \mu_{2,1}, \mu_{2,2}) \leq \Delta f_\mu$

For example, $f(\mu_{1,1}, \mu_{1,2}, \mu_{2,1}, \mu_{2,2})$ may be calculated as follows:

$$f(\mu_{1,1}, \mu_{1,2}, \mu_{2,1}, \mu_{2,2}) = \sqrt{\left(\frac{p_1}{N_1^2}\sum_{i=1}^{N_1}[(x_i - \mu_{1,i})^2 \cdot \sigma_{x_i}^2] + \frac{p_2}{N_2^2}\sum_{j=1}^{N_2}[(x_j - \mu_{1,j})^2 \cdot \sigma_{x_j}^2]\right)} \quad (2)$$

In the above formulas $f(\mu_{1,1}, \mu_{1,2}, \mu_{2,1}, \mu_{2,2})$ corresponds to the combined error or combined uncertainty of a two-level variance calculation. Such a two-level variance calculation is based on a first variance calculation on the basis of a first number of samples $N_1$ and a second variance calculation on the basis of a second number of samples $N_2$. $p_1$ and $p_2$ correspond to suitable factors. For example, $p_1$ and $p_2$ may be 4. The value may be calculated from a mean value of $N_1$ samples around a specific sample.

$$\mu_{1,i} = \frac{1}{N_1}\sum_{i=1}^{N_1} x_i$$

For example, this mean value may be calculated from a specific number of measurement values $x_i$ that are located at a very close distance around a specific position along the x-axis. Nevertheless, as is clearly evident, any other kind of sampling or statistics may be employed. For example, a number of measurements may be performed and the mean value over a number of measurements may be assessed and the like. The value $I_{N2}$ may be calculated in a corresponding manner.

Moreover $\sigma_{xi}^2$ corresponds to the variance at a sample position based on the number $N_1$.

$$\text{Variance, } \sigma_{xi}^2 = \frac{1}{N_1}\sum_{i=1}^{N_1}(x_i - I_{N_1})^2$$

Accordingly, the above formula (2) includes the first and the second variance as well as the first and second numbers of samples $N_1$, $N_2$. Hence, the combined error or uncertainty depends on the first and the second variance as well as from the first and second numbers of samples $N_1$, $N_2$.

In the above formulas typical values of $N_1$, $N_2$ may be $N_1$=25 and $N_2$=9 according to todays hardware equipment.

Figure 3A:
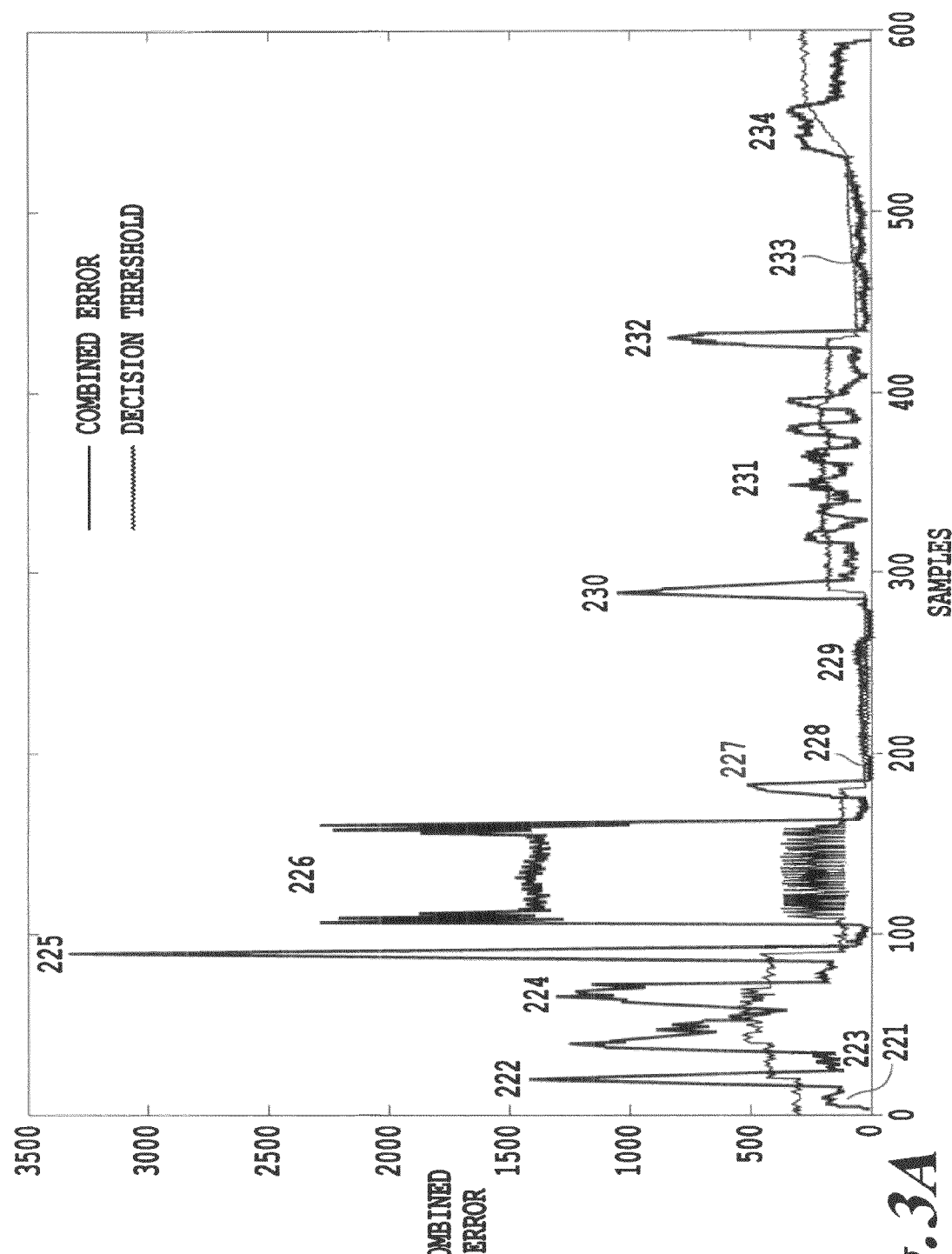
FIG. 3A is a diagram showing a combined error of the signal shown in FIG. 2B and a decision threshold curve.

FIG. 3A shows a diagram of the combined error $f(\mu_{2,1}, \mu_{2,2})$.

As has been explained above, the threshold curve may be calculated from the noise function of the specific sensor type employed and the numbers of samples $N_1$, $N_2$. As is clearly to be understood, the expectation value may be determined so that a higher or lower probability of finding a measurement value within a region around the expectation value is attained.

According to the embodiment, in case of a camera system, a Poisson distributed noise may be assumed.

Accordingly, the noise variance can be expressed as:

$\sigma_0^2 = a + bI$

In this formula, the noise variance characteristics has a fixed part (a) and a signal dependent part (b·I). Therefore, the threshold curve will follow the signal with variable value based on the signal intensity. For example, the parameters a and b may be determined by taking a variety of measurements with a specific camera which is used for taking the measurement values shown in FIG. 2A.

FIG. 3A shows a diagram of the combined error plotted against the decision threshold. Accordingly at 221, 223, 228, the decision threshold curve has a larger magnitude compared to the signal error curve. Accordingly, the regions 221, 223 and 228 are classified as flat or homogenous. Moreover, at the non-periodic structured region 224, the decision threshold curve is below the signal error curve thus classifying this region to be non-flat. In region 226 where there is a periodic structure with very high spatial frequency, the decision threshold curve is below the signal error curve, thus classifying this region to be non-flat. At region 229, there is a periodic structure with a very high spatial frequency but a very low signal level and a very low variation. The threshold curve is below the signal error curve thus classifying this region to be non-flat. At region 231, there is a periodic step-like pattern with small intensity difference between the steps. The threshold curve has the lower height at the step-like edges. On the other hand, the homogenous areas of this regions have higher error compared to the threshold.

Region 233 with low-slope ramp provides a threshold curve above the error level, thus classifying this region as a flat region. At region 234, there is a very high-slope ramp, the signal error is higher than the threshold curve thus classifying it as a non-flat region.

Figure 3B:
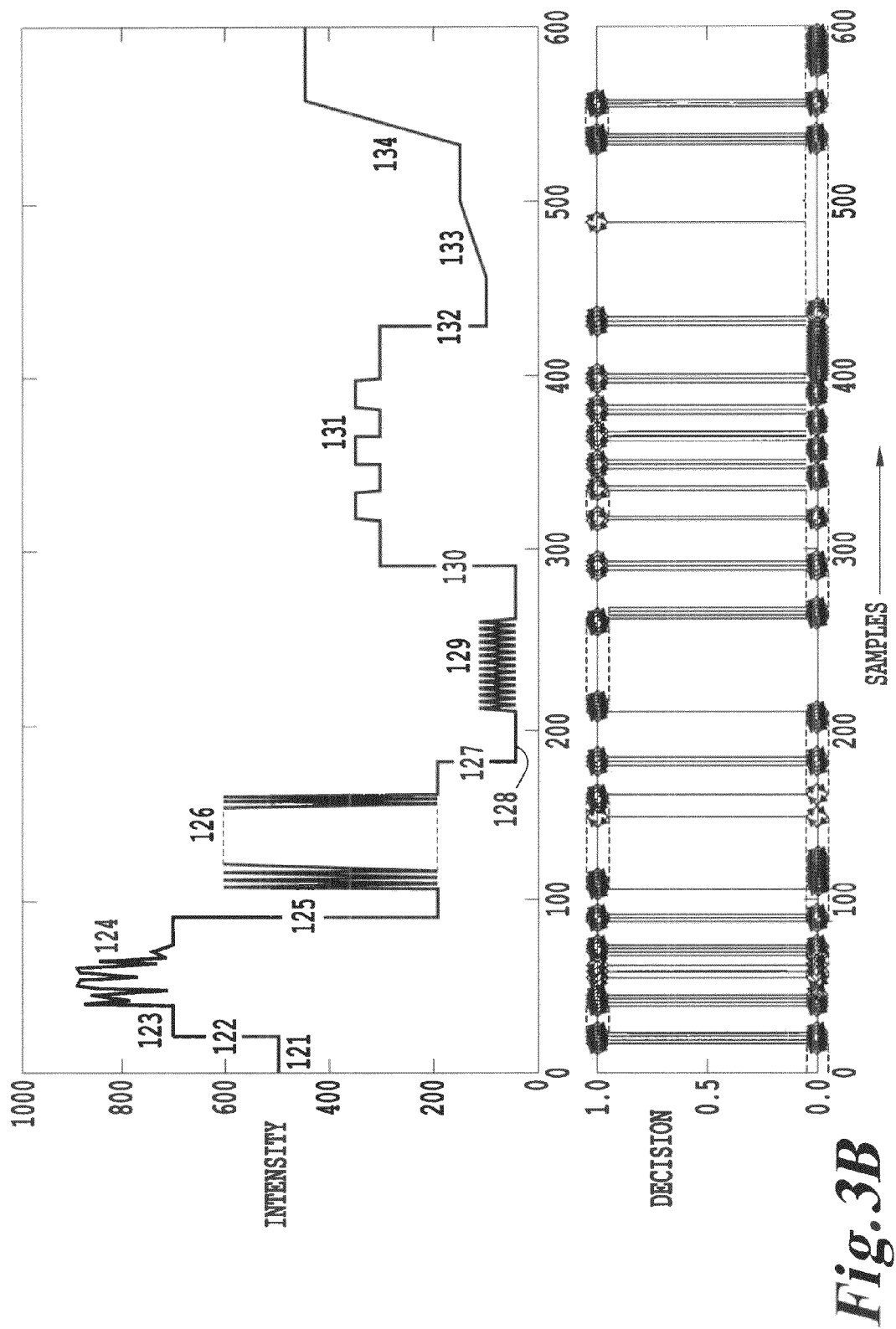
FIG. 3B is a diagram showing in the upper portion thereof the signal shown in FIG. 2A and in the lower portion thereof a decision map that may be obtained by performing the method according to an embodiment.

As a result, the decision map of the signal shown in FIG. 3B, that is obtained from the above method, is identical with the decision map shown in FIG. 2C that is obtained from a visual inspection. Accordingly, it shows the desired result. Accordingly, this method detects homogenous regions perfectly and also the high frequency regions. Accordingly, by using the method as has been explained above, it is possible to obtain a decision map with a limited number of samples. For example typical number of samples may be below 100 or even below 50. As a result, system resources such as memory and processing power may be stressed to a lower degree than with conventional methods. Accordingly, the method described herein may be applied to portable devices having limited processing capabilities such as mobile phones and others. Nevertheless, as is also clearly to be understood, the method and device may also work with very large sample numbers.

Returning to the device shown in FIG. 1, the combination of the signal shown in FIG. 2B and the decision map shown in FIG. 3B may be transmitted to the component 5 shown in FIG. 1, where the further processing of the signal data may be performed as is generally known.

Figure 4:
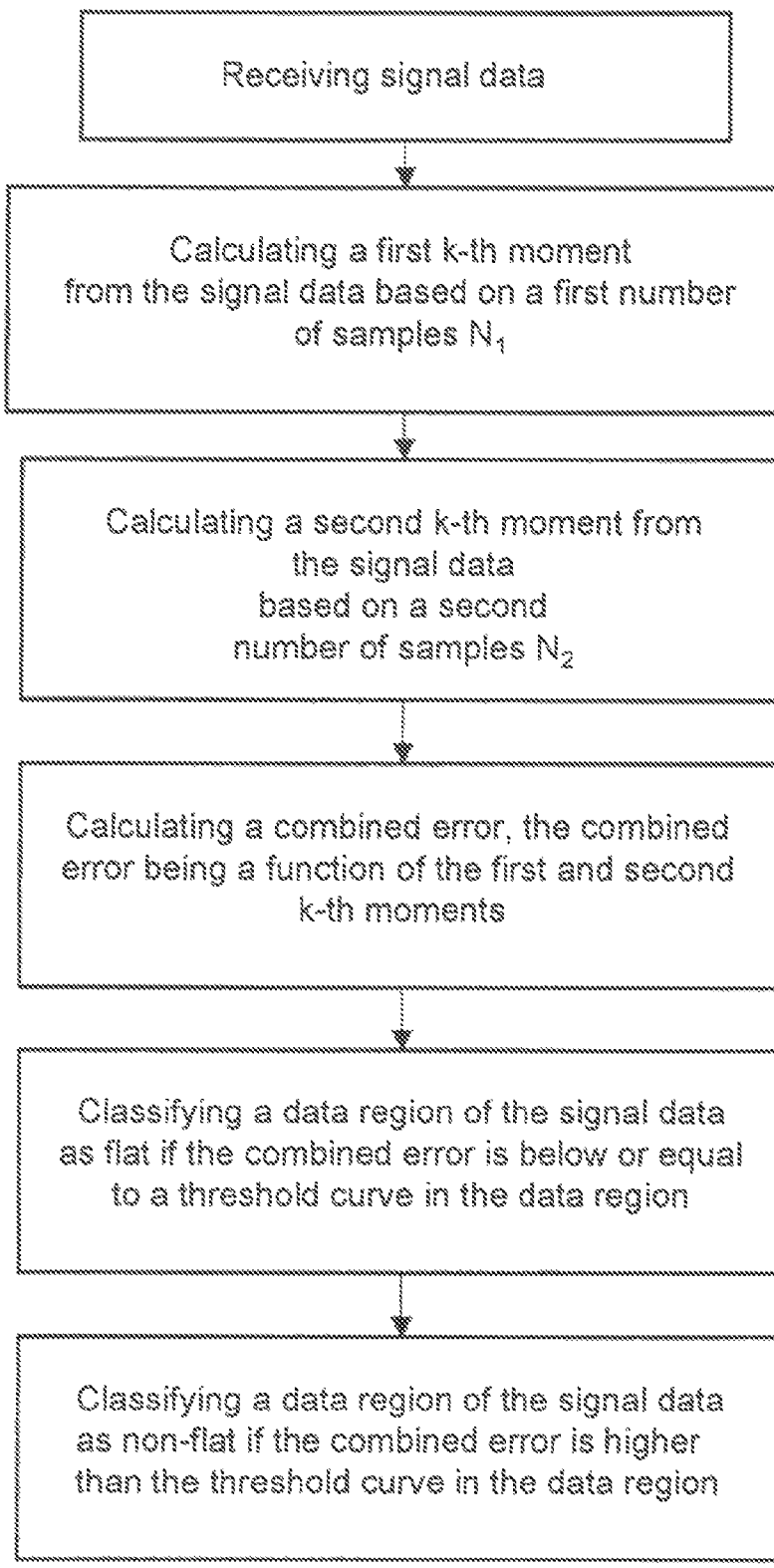
FIG. 4 is a flowchart illustrating the method according to an embodiment.

FIG. 4 shows a flow chart of the method as has been described above. In a first step, signal data are received. Thereafter, a first k-th moment is calculated from the signal data based on a first number of samples $N_1$. Then, a second k-th moment is calculated from the signal data based on a second number of samples $N_2$. Thereafter, a combined error is calculated, wherein the combined error is a function of the first and the second k-th moments. For example, the combined error may be calculated as has been explained above or using the above formula (2). The data region of the signal data is classified as flat if the combined error is below or equal to a threshold curve and a data region of the signal data is classified as non-flat if the combined error is higher than the threshold curve.

For example, the threshold curve may depend on the first and the second number of samples $N_1$, $N_2$. Moreover, the threshold curve may depend on the noise distribution. For example, the threshold curve may be constant. Alternatively, the threshold curve may be variable. Further, the threshold curve may vary depending on the first or the second mean value. The method may further comprise low-pass filtering the signal data at the flat region. Moreover, the method may further comprise high-pass filtering the signal data at the non-flat region.

As is clearly to be understood, in addition to the first and second k-th moments, the k-th moment may also be calculated from the signal data based on further number of samples, for example $N_3$ and $N_4$.

According to a further embodiment, the threshold curve may be determined on the basis of a Gaussian distributed noise condition. For a Gaussian distributed noise, $\sigma_0^2 = M$. Accordingly, this type of noise has only a fixed value indicating a fixed threshold value for the entire signal. For example, this kind of noise may be present in a transmission channel.

In an example, M may be 10. Moreover, $N_1$ may be 9 and $N_2$ may be 5. In this case $\Delta f_\mu$ may be equal to 22.3. This value may be used as the decision threshold and it will be a constant value for the Gaussian distributed noise.

Figure 5A:
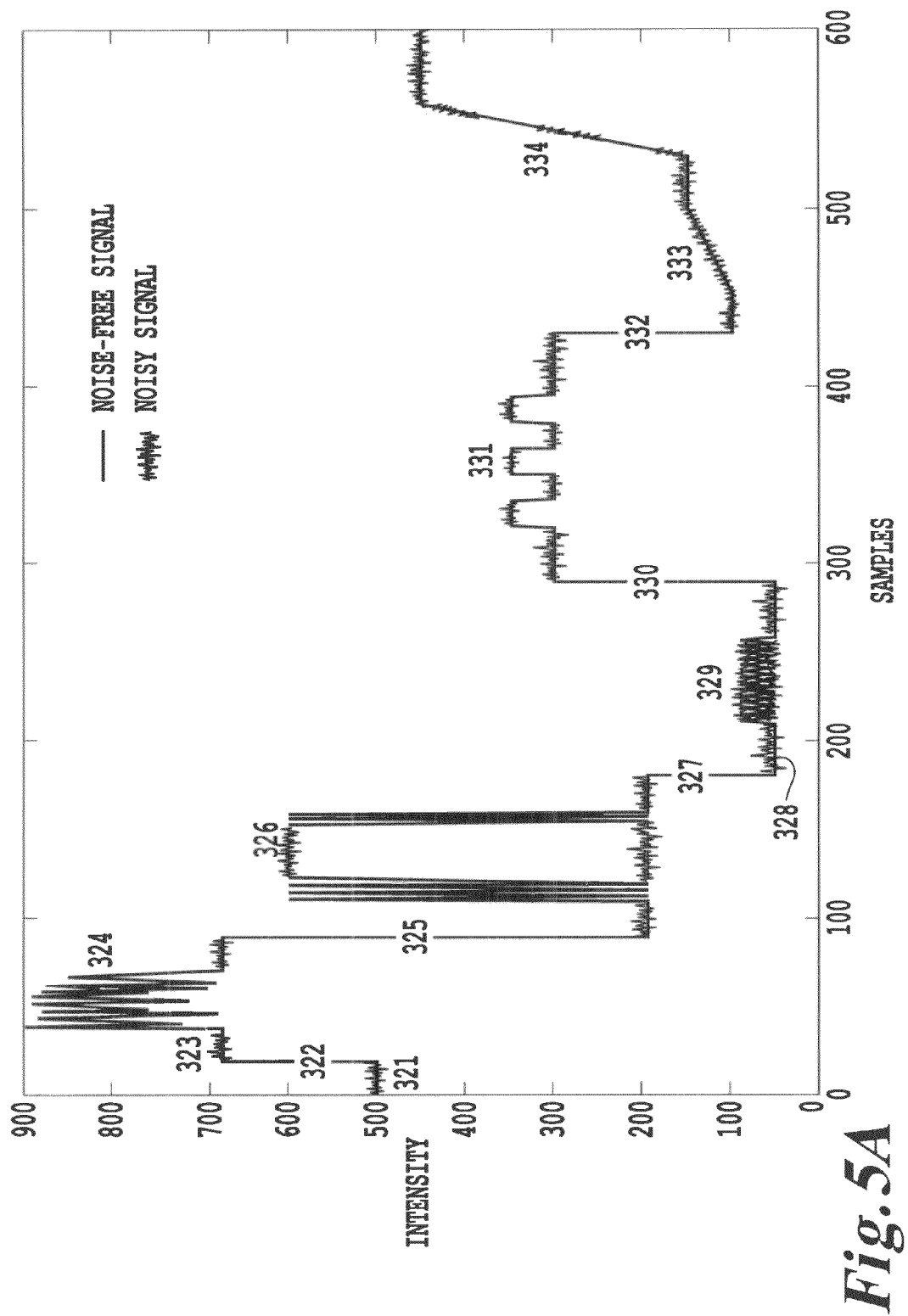
FIG. 5A shows the signal shown in FIG. 2A with a different type of noise.
Figure 5B:
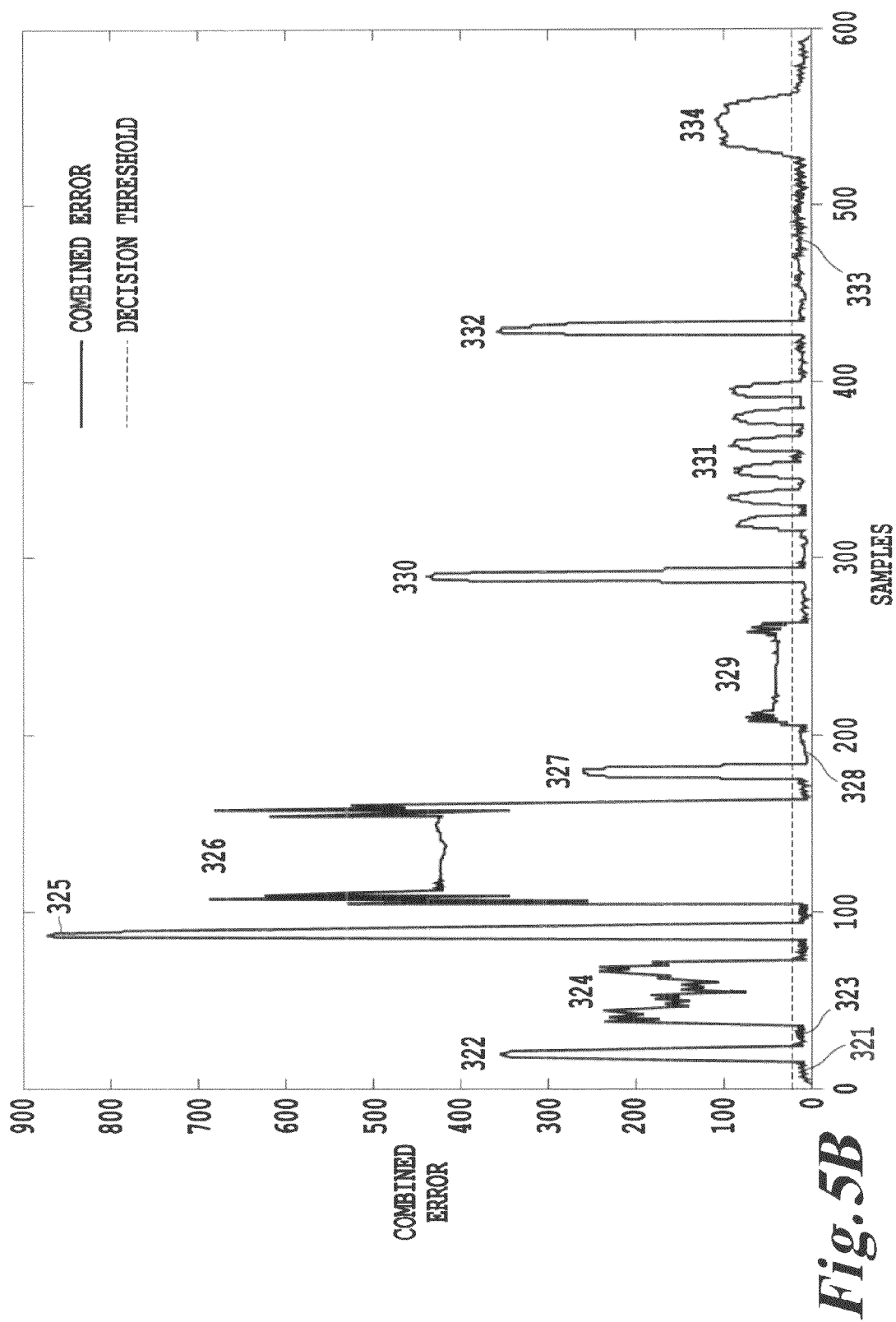
FIG. 5B illustrates the combined error of the signal shown in FIG. 5A and the decision threshold according to a further embodiment.
Figure 5C:
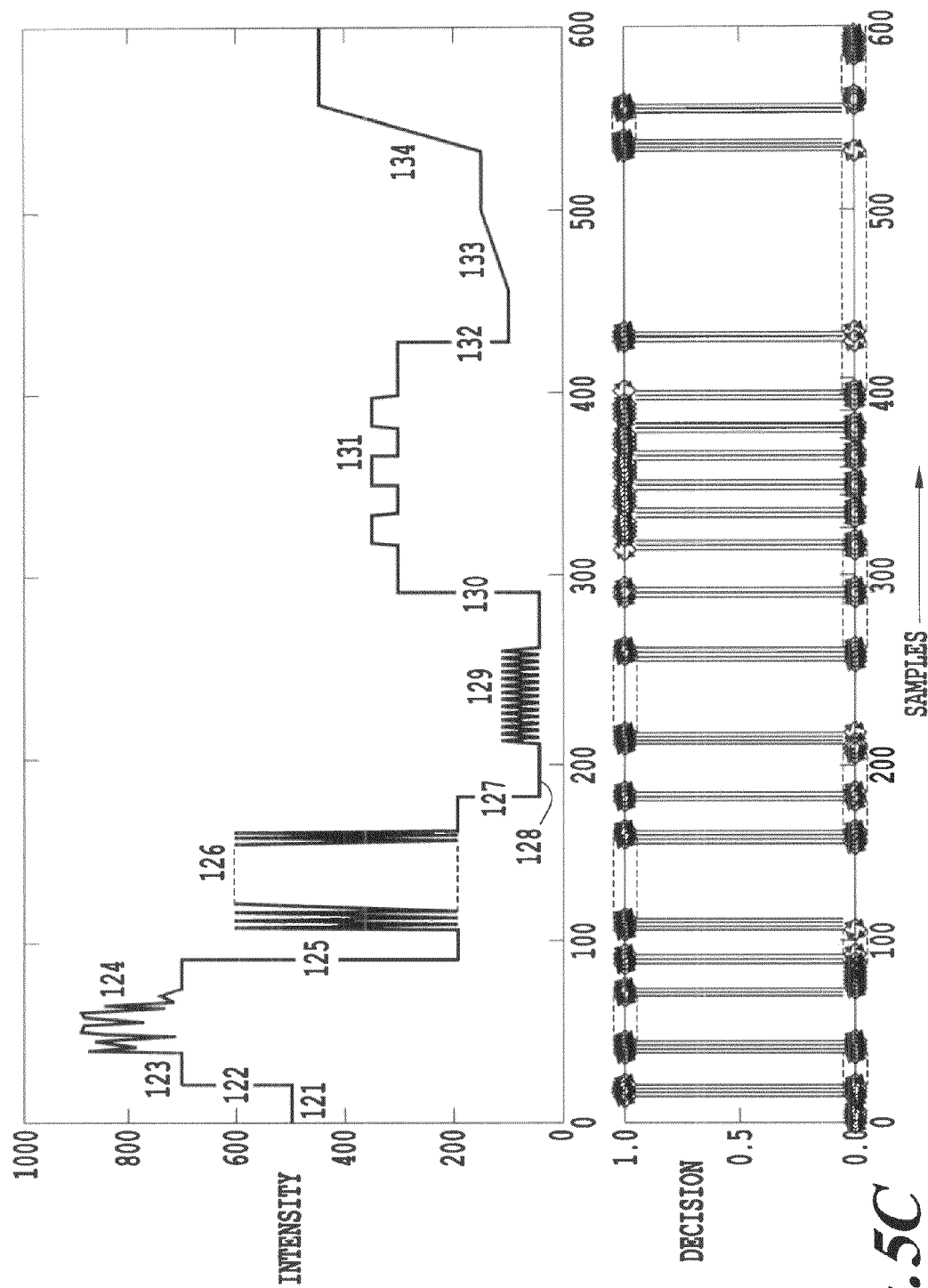
FIG. 5C shows in the upper portion thereof the signal data shown in FIG. 2A and a decision map obtained by performing the method according to an embodiment.

FIG. 5A shows the signal shown in FIG. 2A, the signal including Gaussian noise. In FIG. 5A, the reference numerals of FIG. 2A are incremented by "200" and refer to the same features as shown in FIG. 2A. FIG. 5B shows the combined error of the signal shown in FIG. 5A in comparison with the decision threshold that is calculated according to the Gaussian noise behavior. Moreover, FIG. 5C shows a decision map for this kind of decision threshold curve.

The specification also relates to computer program product comprising a computer program means that is adapted to carry out the method as has been explained above and the steps thereof when it is carried out on a data processing device. For example, the computer program means may be carried out on a computer, a digital signal processing device, any kind of suitable processor and the like as are generally well known. Moreover, the specification relates to a computer readable storage medium comprising the computer program product as specified above. The computer readable storage medium may be any of the kind as are usually employed.

While embodiments of the invention have been described above, it is obvious that further embodiments may be implemented. Accordingly, this spirit and scope of the appended claims should not be limited to the description of the embodiments contained herein.

The invention claimed is:

1. A method of processing signal data, the method comprising:
   receiving signal data;
   calculating, via processing circuitry, a first k-th moment from the signal data based on a first number of samples $N_1$;
   calculating, via the processing circuitry, a second k-th moment from the signal data based on a second number of samples $N_2$, the first number $N_1$ being different than the second number $N_2$;
   calculating, via the processing circuitry, a combined error, the combined error being a function of the first and second k-th moments;
   classifying, via the processing circuitry, a data region of the signal data as flat if the combined error is below or equal to a threshold curve in the data region; and
   classifying, via the processing circuitry, a data region of the signal data as non-flat if the combined error is higher than the threshold curve in the data region.

2. The method of claim 1, further comprising:
   calculating, via the processing circuitry, a first m-th moment from the signal data based on the first number of samples $N_1$;
   calculating, via the processing circuitry, a second m-th moment from the signal data based on the second number of samples $N_2$, m being different than k;
   wherein the combined error is a function of the first and second k-th moments and the first and second m-th moments.

3. The method of claim 2, wherein
   the threshold corresponds to the combined uncertainty in relation to the first and second numbers of samples and with respect to the k-th and m-th moments.

4. The method according to claim 2, wherein k is equal to 2 and m is equal to 1.

5. The method of claim 1, wherein
   the threshold corresponds to the statistical expectation value in relation to the first and second numbers of samples and with respect to the k-th moment.

6. The method according to claim 1, wherein the threshold curve depends on the first and the second number of samples $N_1$, $N_2$.

7. The method according to claim 1, wherein the threshold curve depends on the noise distribution.

8. The method according to claim 1, further comprising low pass filtering the signal data at the flat region.

9. The method according to claim 1, further comprising high pass filtering the signal data at the non-flat region.

10. A device for processing signal data, the device comprising:
  circuitry configured to:
    receive signal data;
    calculate a first k-th moment from the signal data based on a first number of samples $N_1$;
    calculate a second k-th moment from the signal data based on a second number of samples $N_2$, the first number $N_1$ being different than the second number $N_2$;
    calculate a combined error, the combined error being a function of the first and second k-th moments;
    classify a data region of the signal data as flat if the combined error is below or equal to a threshold curve in the data region; and
    classify a data region of the signal data as non-flat if the combined error is higher than the threshold curve in the data region.

11. The device of claim 10, wherein
the circuitry is further configured to:
  calculate a first m-th moment from the signal data based on the first number of samples $N_1$; and
  calculate a second m-th moment from the signal data based on the second number of samples $N_2$, m being different than k; and
  wherein the combined error is a function of the first and second k-th moments and the first and second m-th moments.

12. The device of claim 10, further comprising a low pass filter that is configured to filter the signal data at the flat regions.

13. The device of claim 10, further comprising a high pass filter that is configured to filter the signal data at the non-flat regions.

14. A non-transitory computer readable storage medium storing a program which when executed by a data processing device causes the data processing device to perform a method, the method comprising:
  receiving signal data;
  calculating a first k-th moment from the signal data based on a first number of samples $N_1$;
  calculating a second k-th moment from the signal data based on a second number of samples $N_2$, the first number $N_1$ being different than the second number $N_2$;
  calculating a combined error, the combined error being a function of the first and second k-th moments;
  classifying a data region of the signal data as flat if the combined error is below or equal to a threshold curve in the data region; and
  classifying a data region of the signal data as non-flat if the combined error is higher than the threshold curve in the data region.

* * * * *